US006793025B2

(12) United States Patent
Patel et al.

(10) Patent No.: US 6,793,025 B2
(45) Date of Patent: Sep. 21, 2004

(54) DOUBLE EMULSION BASED DRILLING FLUIDS

(75) Inventors: Arvind D. Patel, Sugar Land, TX (US); Reginald J. Bell, Houston, TX (US); Steve Young, Spring, TX (US); Ahmadi Tehrani, Banchory (GB)

(73) Assignee: M-I L. L. C., Houston, TX (US)

( * ) Notice: Subject to any disclaimer, the term of this patent is extended or adjusted under 35 U.S.C. 154(b) by 0 days.

(21) Appl. No.: 10/172,837

(22) Filed: Jun. 17, 2002

(65) Prior Publication Data

US 2003/0075360 A1 Apr. 24, 2003

Related U.S. Application Data

(63) Continuation-in-part of application No. 09/757,570, filed on Jan. 10, 2001, now Pat. No. 6,405,809, which is a continuation-in-part of application No. 09/514,680, filed on Feb. 28, 2000, now Pat. No. 6,308,788, which is a continuation-in-part of application No. 09/021,013, filed on Feb. 9, 1998, now Pat. No. 6,029,755, which is a continuation-in-part of application No. 09/013,454, filed on Jan. 26, 1998, now Pat. No. 5,990,050, which is a continuation-in-part of application No. 09/004,267, filed on Jan. 8, 1998, now abandoned.

(51) Int. Cl.$^7$ .......................... C09K 7/06; E21B 21/00; E21B 49/00

(52) U.S. Cl. ................. 175/50; 73/152.02; 73/152.03; 166/254.2; 175/65; 507/103; 507/129; 507/130; 507/135; 507/136; 507/240; 507/248; 507/260; 507/904

(58) Field of Search .................. 166/254.2; 175/50, 175/65, 66; 73/152.02, 152.03; 507/103, 129, 130, 135, 136, 240, 248, 260, 904, 910

(56) References Cited

U.S. PATENT DOCUMENTS

| | | |
|---|---|---|
| 2,216,955 A | 10/1940 | Moore |
| 2,542,020 A | 2/1951 | Fischer |
| 2,552,775 A | 5/1951 | Fischer et al. |
| 2,557,647 A | 6/1951 | Gates et al. |
| 2,573,961 A | 11/1951 | Fischer |
| 2,696,468 A | 12/1954 | Fischer |
| 2,712,629 A | 7/1955 | Doll |
| 2,717,239 A | 9/1955 | Fischer et al. |
| 2,721,841 A | 10/1955 | Fischer |
| 2,739,120 A | 3/1956 | Fischer |
| 2,750,557 A | 6/1956 | Bicaud |
| 2,793,187 A | 5/1957 | Fischer |
| 2,802,531 A | 8/1957 | Cardwell et al. |
| 2,900,336 A | 8/1959 | Brown et al. |
| 2,900,337 A | 8/1959 | Earley et al. |
| 2,930,969 A | 3/1960 | Baker |
| 2,943,051 A | 6/1960 | Lummus |
| 2,990,337 A | 6/1961 | Calam et al. |
| 2,999,063 A * | 9/1961 | Raymond .................. 507/128 |
| 3,007,865 A | 11/1961 | Priest |
| 3,048,549 A | 8/1962 | Adams |
| 3,086,937 A * | 4/1963 | Fischer ........................ 507/131 |
| 3,521,154 A | 7/1970 | Maricelli |
| 3,634,235 A * | 1/1972 | Wilson et al. ............... 507/108 |
| 3,637,495 A | 1/1972 | Eckert et al. |
| 3,757,575 A * | 9/1973 | Murphy et al. ........... 73/152.08 |

(List continued on next page.)

FOREIGN PATENT DOCUMENTS

| | | |
|---|---|---|
| DE | 3842703 A1 | 6/1990 |
| EP | 0266 250 A2 | 6/1987 |

(List continued on next page.)

OTHER PUBLICATIONS

International Search Report—International Application No. PCT/US 03/18973—International Filing Date Jun. 17, 2003—Applicant: M–I L.L.C.

(List continued on next page.)

Primary Examiner—George Suchfield
(74) Attorney, Agent, or Firm—Howrey Simon Arnold & White L.L.P.; Carter White

(57) ABSTRACT

A method of electrically logging subterranean wells using a conductive double emulsion fluid includes a miscible combination of an oleaginous fluid, an emulsifier capable of forming a microemulsion, an emulsifier capable of forming an invert emulsion, and an electrolytic salt. A microemulsion is the continuous phase of an invert emulsion. The electrolytic salt or brine of the salt is present in a concentration sufficient to permit the electrical logging of the subterranean well. The fluid may additionally contain a polar organic solvent and a carbon dioxide buffer. The polar organic solvent may be an oil soluble glycol or glycol ether such as ethylene glycol, diethylene glycol, propylene glycol, polypropylene glycol, and the like. The electrolytic salt preferably is a quaternary amine salt having the formula:

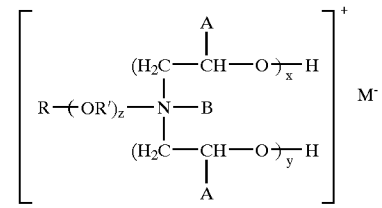

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M$^-$ is a counter anion; or combinations thereof. In such instances the quaternary amine salt serves both as the electrolyte and the microemulsifier. The carbon dioxide buffer is preferably a trialkylanol amine.

49 Claims, No Drawings

U.S. PATENT DOCUMENTS

| | | | |
|---|---|---|---|
| 3,764,531 A | | 10/1973 | Eckert et al. |
| 3,804,760 A | | 4/1974 | Darley |
| 3,850,248 A | | 11/1974 | Carney |
| 3,878,111 A | | 4/1975 | McGlothlin et al. |
| 3,899,431 A | * | 8/1975 | Hayes et al. ............... 507/135 |
| 3,948,782 A | | 4/1976 | Dreher et al. |
| 3,954,637 A | | 5/1976 | Pardee et al. |
| 3,962,151 A | | 6/1976 | Dekker et al. |
| 3,976,582 A | | 8/1976 | Douglas et al. |
| 4,012,329 A | | 3/1977 | Hayes et al. |
| 4,022,276 A | | 5/1977 | Dreher et al. |
| 4,040,866 A | | 8/1977 | Mondshine |
| 4,230,586 A | | 10/1980 | Bretz et al. |
| 4,405,464 A | | 9/1983 | Baldwin et al. |
| 4,431,069 A | | 2/1984 | Dickinson, III et al. |
| 4,439,345 A | | 3/1984 | Duke |
| 4,447,338 A | | 5/1984 | Lundberg et al. |
| 4,455,241 A | | 6/1984 | Swanson |
| 4,464,269 A | | 8/1984 | Walker et al. |
| 4,468,623 A | | 8/1984 | Gianzero et al. |
| 4,486,340 A | * | 12/1984 | Glass, Jr. .................. 507/216 |
| 4,494,610 A | | 1/1985 | Walker |
| 4,502,963 A | | 3/1985 | Harmon |
| 4,508,628 A | | 4/1985 | Walker et al. |
| 4,525,522 A | | 6/1985 | Turner et al. |
| 4,526,693 A | | 7/1985 | Son et al. |
| 4,526,696 A | | 7/1985 | Delourme et al. |
| 4,567,759 A | | 2/1986 | Elstrom et al. |
| 4,582,543 A | | 4/1986 | Bretz |
| 4,615,813 A | | 10/1986 | Bretz |
| 4,631,136 A | | 12/1986 | Jones, III |
| 4,645,608 A | | 2/1987 | Rayborn |
| 4,647,859 A | | 3/1987 | Son et al. |
| 4,659,486 A | | 4/1987 | Harmon |
| 4,670,550 A | | 6/1987 | Bleeker et al. |
| 4,689,161 A | | 8/1987 | Blumenthal et al. |
| 4,725,372 A | * | 2/1988 | Teot et al. ................ 507/129 |
| 4,735,731 A | | 4/1988 | Rose et al. |
| 4,747,969 A | | 5/1988 | Rupilius et al. |
| 4,790,958 A | | 12/1988 | Teot |
| 4,828,724 A | | 5/1989 | Davidson |
| 4,830,765 A | | 5/1989 | Perricone et al. |
| 4,848,487 A | | 7/1989 | Anderson et al. |
| 4,853,097 A | | 8/1989 | Marchionni et al. |
| 4,941,981 A | | 7/1990 | Perricone et al. |
| 4,950,995 A | | 8/1990 | Falk |
| 4,963,273 A | | 10/1990 | Perricone et al. |
| 4,964,615 A | | 10/1990 | Mueller et al. |
| 4,968,320 A | | 11/1990 | Genova et al. |
| 5,032,395 A | | 7/1991 | Clark et al. |
| 5,034,139 A | | 7/1991 | Reid et al. |
| 5,034,140 A | | 7/1991 | Gardner et al. |
| 5,045,158 A | | 9/1991 | Chittofrati et al. |
| 5,057,234 A | | 10/1991 | Bland et al. |
| 5,061,386 A | | 10/1991 | Muijs et al. |
| 5,072,794 A | | 12/1991 | Hale et al. |
| 5,086,841 A | | 2/1992 | Reid et al. |
| 5,096,883 A | | 3/1992 | Mercer et al. |
| 5,120,708 A | | 6/1992 | Melear et al. |
| 5,141,920 A | | 8/1992 | Bland et al. |
| 5,156,686 A | | 10/1992 | Van Slyke |
| 5,189,012 A | | 2/1993 | Patel et al. |
| 5,223,175 A | | 6/1993 | Mabire |
| 5,232,910 A | | 8/1993 | Mueller et al. |
| 5,254,531 A | | 10/1993 | Mueller et al. |
| 5,284,635 A | | 2/1994 | Frederic |
| 5,333,698 A | | 8/1994 | Van Slyke |
| 5,348,938 A | | 9/1994 | Mueller et al. |
| 5,403,820 A | | 4/1995 | Walker |
| 5,432,152 A | | 7/1995 | Dawson et al. |
| 5,439,055 A | | 8/1995 | Card et al. |
| 5,472,937 A | | 12/1995 | Fleming et al. |
| 5,494,120 A | | 2/1996 | Hale et al. |
| H1611 H | | 11/1996 | Patel |
| 5,589,442 A | | 12/1996 | Gee et al. |
| 5,597,792 A | | 1/1997 | Klier et al. |
| 5,602,082 A | | 2/1997 | Hale et al. |
| 5,627,143 A | | 5/1997 | Sawdon |
| 5,628,833 A | | 5/1997 | McCormack et al. |
| 5,634,969 A | | 6/1997 | Cody et al. |
| 5,634,984 A | | 6/1997 | Van Slyke |
| 5,635,457 A | | 6/1997 | Van Slyke |
| 5,707,939 A | | 1/1998 | Patel |
| 5,780,407 A | | 7/1998 | Van Slyke |
| 5,905,061 A | | 5/1999 | Patel |
| 5,990,050 A | | 11/1999 | Patel |
| 6,006,831 A | | 12/1999 | Schlemmer |
| 6,029,755 A | | 2/2000 | Patel .......................... 175/50 |
| 6,194,354 B1 | * | 2/2001 | Hatchman .................. 507/134 |
| 6,308,788 B1 | | 10/2001 | Patel et al. .................. 175/50 |
| 6,405,809 B2 | * | 6/2002 | Patel et al. ................... 175/50 |
| 6,525,003 B2 | * | 2/2003 | Schlemmer et al. ........ 507/103 |
| 6,608,005 B2 | * | 8/2003 | Palmer et al. .............. 507/103 |
| 2001/0001991 A1 | | 5/2001 | Patel et al. .................. 175/50 |

FOREIGN PATENT DOCUMENTS

| | | |
|---|---|---|
| EP | 0 374671 A1 | 6/1990 |
| EP | 0 495579 A3 | 7/1992 |
| EP | 0 652271 A1 | 5/1995 |
| EP | 0 730018 A1 | 1/1996 |
| EP | 0 902076 A2 | 2/1998 |
| GB | 751191 | 6/1956 |
| GB | 2195685 A | 12/1988 |
| GB | 2 223255 A | 4/1990 |
| GB | 2223255 | 4/1990 |
| GB | 2 251447 A | 8/1992 |
| GB | 2 252993 A | 8/1992 |
| GB | 2 283036 A | 4/1995 |
| NO | 9402000 | 12/1994 |
| SU | 1763470 A1 | 9/1992 |
| WO | WO 87/02692 | 5/1987 |
| WO | WO 89/01491 | 2/1990 |
| WO | WO 90/06980 | 6/1990 |
| WO | WO 90/06981 | 6/1990 |
| WO | WO 92/14798 | 9/1992 |
| WO | WO 92/22622 | 12/1992 |
| WO | WO 93/16145 | 8/1993 |
| WO | WO 93/23491 | 11/1993 |
| WO | WO 94/06883 | 3/1994 |
| WO | WO 94/16030 | 7/1994 |
| WO | WO 94/28087 | 12/1994 |
| WO | WO 95/17244 | 6/1995 |
| WO | WO 96/19545 | 6/1996 |
| WO | WO 97/10313 | 3/1997 |
| WO | WO 98/05735 | 2/1998 |
| WO | WO99/14285 | 3/1999 |
| WO | WO 99/14286 | 3/1999 |
| WO | WO99/35211 | 7/1999 |
| WO | 99 35212 | 7/1999 |

OTHER PUBLICATIONS

Kirk–Othmer, "Encyclopedia of Chemical Technology", Third Edition, vol. 1, A to Alkanolamines, pp. 944–960, 1978.

"Fine and Functional Chemicals", Nitrogen Derivatives, AKZO General Catalog. Copyright 1990.

"Quaternary Ammonium Compounds", Fine and Functional Chemicals, AKZO Catalog. Copyright 1990.

Aldrich Katalog Handbuch Feinchemikalien, Aldrich GmbH & Co. KG, Steinheim, p. 557, DE 1994.

Chemical Abstracts Search, 35 pages, Apr. 2, 1997.

STN International Search, Chemical Abstracts and World Patent Index, 41 pages, Apr. 9, 1997.

Database Internet Online!; Database accession No. http://www.surface.akzonobel.com/p/index.htm.

Database WPI Sect. Ch., Week 8502, Derwent publications ltd., London, GB; AN 85–011286 , XP002066439 & SU 1 097 638A (Moscow Gubkin Petrochem).

Calloni, G. et al. "Carbon Black: A Low Cost Colloidal Additive for Controlling Gas–Migration in Cement Slurries"; SPE International Symposium on Oilfield Chemistry; San Antonio, Texas, USA; Feb. 14–17, 1995; SPE 28959.

Mark, H. F. Editor: "Encyclopedia of Polymer Science & Engineering, vol. 2, "Carbon Black", pp. 623–637" 1985, John Wiley & Sons, New York.

Dickey, Parke A.; Petroleum Development Geology, 2nd Ed.; Penn Well Books before 1988, pp. 57–83.

The Dow Chemical Company; Physical Properties of Dowanol Glycol Ethers and Acetates; table; Jun. 1995.

The Dow Chemical Company; Material Safety Data Sheet, Oct. 20, 1997.

The Dow Chemical Company; Product Information—Dowanol DPNB, Apr. 1997.

The Dow Chemical Company; The Glycol Ethers Handbook, Oct. 1993.

Chemical Abstract Services Search Report, Oct. 27, 1997.

Akzo Nobel Chemicals Inc.; Material Safety Data Sheet, Aug. 28, 1997.

Akzo Nobel Chemicals Inc., Material Safety Data Sheet, Jun. 11, 1998.

Special Products, Div. of Champion Technologies, Inc.. Certificate of Analysis for M–I Drilling Fluids, Dec. 16, 1997.

M–I L.L.C.; Transportation & Material Safety Data Sheet (EMI–523), Jun. 26, 1997.

M–I L.L.C.; Material Safety Data Sheet (EMI–524 A), Oct. 24, 1997.

Akzo Nobel Chemicals Inc.; Catalog "*Surface Chemistry/ Industrial Surfactants/Nitrogen Derivatives,*" *pp. 1–39, Pub. 36–100 (1996).*

Tomah Products, Inc. Formulary and Application Guide.

Translation dated May 31, 1991 of PCT document No.: WO90/06980.

* cited by examiner

DOUBLE EMULSION BASED DRILLING FLUIDS

This is a continuation-in-part of application Ser. No. 09/757,570; filed on Jan. 10, 2001 now U.S. Pat. No. 6,405,809, which is a continuation-in-part of application Ser. No. 09/514,680; filed on Feb. 28, 2000 now U.S. Pat. No. 6,308,788, which is a continuation-in-part of application Ser. No. 09/021,013, now U.S. Pat. No. 6,029,755, filed on Feb. 9, 1998; which is a continuation-in-part of application Ser. No. 09/013,454, now U.S. Pat. No. 5,990,050 filed on Jan. 26, 1998; which is a continuation-in-part of application Ser. No. 09/004,267, now abandoned, filed on Jan. 8, 1998.

BACKGROUND OF THE INVENTION

The use of wireline well logs is well known in the art of drilling subterranean wells and in particular oil and gas wells. A wireline log is generated by lowering a logging tool down the well on a wireline. The tool is slowly brought back to the surface and the instruments on the logging tool take measurements that characterize the formations penetrated by the well in addition to other important properties of the well. Electrical logs and other wireline log techniques are depended upon in the oil and gas exploration industry to determine the nature of the geology and the reservoir properties of the petroleum bearing formations penetrated by the well. Further, wireline well logs are often the only record of the formations penetrated by the well available for correlation amongst different wells in a particular field.

When an electrical wireline log is made of a well, electrodes on the well logging tool are in contact with wellbore fluid or filter cake and hence the formation rocks through which the well has penetrated. An electrical circuit is created and the resistance and other electrical properties of the circuit may be measured while the logging tool is retracted from the well. The resulting data is a measure of the electrical properties of the drilled formations verses the depth of the well. Another common measurement made with an electrical log, besides resistivity, is the spontaneous or self potential. One of skill in the art of well logging and electrical logging in particular should understand how to interpret the results of such measurements to determine the presence or absence of petroleum or gas, the porosity of the formation rock and other important properties of the well. Further information in this regard can be found in the book entitled "Essentials of Modern Open-hole Log Interpretation" by John T. Dewan the contents of which are hereby incorporated herein by reference, and other similar reference material.

An alternative or supplement to wireline logging involves logging tools placed in specialized drill collar housing and run in the drill string near the bit. This technique is known as logging-while-drilling (LWD) or formation-evaluation-while-drilling(FEWD). Measurements such as electrical resistivity can be thereby taken and stored down hole for later retrieval during a "tripping out" of the drill string, or transmitted to the surface via mud-pulse telemetry. Such techniques should be known to one of skill in the art of well drilling and subterranean well logging.

The use of oil-based muds and drilling fluids has become increasingly popular since their introduction of the technology in the 1950's. Innovations in oil-based muds and drilling fluids are of on-going importance with the development of environmentally friendly drilling fluids and fluids having other special characteristics. Oil-based muds offer advantages over water-based muds in many drilling situations. In particular, oil-based muds are known in the art to provide excellent shale inhibition, borehole stability, lubricity, thermal stability, tolerance of contamination and ease of maintenance. Despite the many benefits of utilizing oil-based muds and drilling fluids, they have disadvantages. One such disadvantage addressed by the present invention is that normal resistivity and self potential measurements cannot be taken when the well has been drilled with a conventional oil-based mud or drilling fluid due to the non-conductive nature of the oil-based drilling fluids and muds.

Oil-external microemulsion fluids containing sodium petroleum sulfonate are reported in the literature, for example see U.S. Pat. No. 4,012,329. A microemulsion is a thermodynamically stable dispersion of one liquid phase into another, stabilized by an interfacial film of surfactant. Microemulsions are typically clear solutions in which there is very low interfacial tension between the two phases. In the microemulsions of U.S. '329, sodium petroleum sulfonate forms micelles that contain water and clay such that the clay has to be added as a dispersion in water an cannot be added as dry powder. This procedure is necessary in order for the clay, barite and other water dispersible materials to be contained within the micelles of the microemulsion. This technology raises logistic issues such as two separate mixers, and makes it more difficult to adjust the mud density during the process of drilling a well. Devices which recycle drilling fluid by solid-separation of the weighting materials are not 100% efficient, and thus the mud density must be continuously adjusted.

There are additional differences between a microemulsion and a standard emulsion in thermodynamic stability as the standard emulsion droplets will eventually agglomerate and the dispersed phase will phase separate. Putting work into a standard emulsion, or increasing the surfactant concentration usually improves its stability, but this does not appear to be the case with microemulsions. Microemulsions are believed to be dependent on specific interactions among the constituent molecules and the interface. If the correct emulsifier is used and the other conditions are right, the microemulsion will likely form spontaneously, without additional mechanical work; however, energy input may decrease the time it takes to reach an equilibrium state. Standard emulsion droplet sizes are much larger, and result in a cloudy or milky dispersion. Additionally, the properties of the filter-cakes formed by the microemulsion, as well as the properties of the fluid filtrate are different. Further, microemulsions tend to have lower conductivity than is needed for some modem logging operations.

Another disadvantage addressed by the present invention is maintaining conductivity over a long period of time. When these fluids and muds are exposed to air, a drop in conductivity occurs. Lime is typically used as a buffer for acidic gases, but begins to lose its effectiveness upon exposure of the fluids and muds to air. Of the many attempts to date, none have met with much success or commercial acceptance in the subterranean well drilling art. Thus there exists an on-going need and desire for drilling fluids and drilling muds that are oil-based and yet allow the taking of wireline electrical logs of the well and electrical-logging-while-drilling.

SUMMARY OF THE INVENTION

The present invention is generally directed to providing an oil-base medium suitable for electrically logging a subterranean well. The medium is an invert emulsion that in its continuous phase includes an oleaginous fluid, and an electrolytic salt. The medium additionally includes an emulsifier capable of forming a microemulsion and an emulsion capable of forming an invert emulsion. Thus, the medium, with water as the discontinuous phase, is an invert emulsion wherein the continuous phase is a microemulsion. The continuous phase is in contact with the logging tool and the wellbore of the well. The continuous phase may have dispersed within it fluid droplets or solid particles immiscible with the continuous phase. The oleaginous fluid may be a diesel, mineral oil, vegetable oil, synthetic oil, silicone oil, or combinations of these fluids. Additionally the logging medium may contain in its continuous phase a polar organic solvent. The polar organic solvent should be at least partially soluble in the oleaginous fluid, but should also have partial solubility in water. Examples of such polarsolvents may include ethylene glycol, diethylene glycol, propylene glycol, polyethylene glycol, polypropylene glycol, and their alkyl ether derivatives. The electrolytic salt or brine should be selected so that it is at least partially soluble in the mixture of oleaginous fluid and polar organic solvent. Suitable salts or brines may include magnesium chloride, sodium chloride, sodium bromide, potassium chloride, ammonium chloride, calcium chloride, calcium bromide, organic salts or combinations thereof Organic salts may include salts such as sodium acetate, potassium acetate, sodium citrate, quaternary amine salts or combinations thereof may be used. A quaternary amine salt is preferably utilized in place of or in addition with the aforementioned electrolytic salts. The quaternary amine salt serves the dual purpose of being both an electrolyte and a microemulsifier. Preferably such quaternary amine salts have the formula:

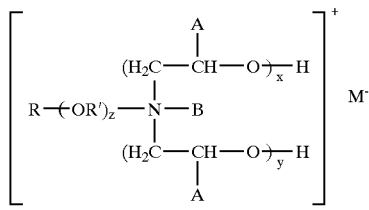

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M− is a counter anion; or combinations thereof. In one preferred embodiment, the electrolytic salt is a quaternary amine salt, having the formula:

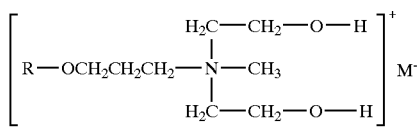

wherein M is any suitable anion, preferably halogen, and R being an alkyl have from 10 to 14 carbon atoms. In another illustrative embodiment of the present invention, the quaternary amine salt is isotridecyloxypropyldihydroxyethylmethylammonium chloride, sold under the tradename Q-17-2PG by Tomah Product Inc. of Milton Wis. USA. The counter-anion to the quaternary amine cation may be the conjugate base of any mineral acid or strong organic acid. Preferably the counter-anion is a halide ion, nitrate ion, sulfate ion, acetate ion, alkyl sulfonate ion, haloalkylsulfonate ion, or the like. Because of the ionic nature of the quaternary amine salts noted above, they function as electrolytes. However, the quaternary amines also exhibit an HLB value that makes them suitable for forming and stabilizing microemulsions. Thus the quaternary amines function both as electrolytes and microemulsifiers.

Emulsifiers of the present invention capable of producing a microemulsion also include dioctyl sulfosuccinate sold under the trade name MONAWET—MO70, and MONAMULSE 653C, both by Uniqema of New Castle, Del., USA.

The continuous phase of the logging medium may additionally contain a carbon dioxide buffer. The cause of the loss of conductivity of the drilling fluids and muds when exposed to air was identified as the carbon dioxide present in air. Lime can be used to buffer acidic gases, but loss of conductivity still occurs upon exposure to air. In the present invention, the addition of an amine was found to maintain conductivity for a longer period of time. Even though the addition of lime is not necessary in the present invention, if it is used, the carbon dioxide will be removed by the amine before the lime. The carbon dioxide buffer may be added at the drilling site or in the initial formulation of the fluid. The carbon dioxide buffer is an amine of the following general formula:

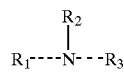

in which, $R_1$, $R_2$, and $R_3$ are hydrogen, alkyl groups with two to five carbon atoms, hydroxyalkylgroups with two to five carbon atoms, or combinations thereof. One preferred carbon dioxide buffer is triethanolamine.

The logging medium may also include viscosifier or gelling agent, such as clays, organophilic clays, polymers, polyamides, polymer emulsions or combinations thereof and the like. In addition, the logging medium of the present invention may have suspended within it a weight material such as hematite, magnetite, iron oxides, illmenite, barite, siderite, celestite, dolomite, calcite, manganese oxides, halites or combinations of these. The continuous phase of the logging medium may comprise the oleaginous fluid together with the polar organic solvent, salt, brine or other materials that may be dissolved therein. These other materials may include corrosion inhibitors, emulsifiers or fluid loss additives.

Another embodiment of the present invention includes drilling a subterranean well with the fluid of the present invention serving as the medium for logging-while-drilling via a suitable tool in the drill string. Another embodiment includes drilling the subterranean well with a drilling fluid in which the logging medium of the present invention is a component. In such an embodiment, the logging medium should be in sufficient concentration so as to enable one to make electrical log measurements of the subterranean well.

The present invention is also directed to a process whereby electric logging is carried out in a wellbore containing the fluid medium described herein. The electrical logging may be by wireline logging methods or by logging while drilling techniques known to the art. The composition of the medium includes an oleaginous fluid, an electrolytic salt, an emulsifier capable of forming a microemulsion and an emulsifier capable of forming an invert emulsion. The fluid may optionally contain a polar organic solvent and a carbon dioxide buffer. In addition, the medium may include gelling agent and weight material, and optionally a corrosion inhibitor. Alternatively, the medium may also include surfactants, emulsifiers, wetting agents, fluid loss control agents or combinations of these in addition to the components previously disclosed above.

DESCRIPTION OF ILLUSTRATIVE EMBODIMENTS

The following terms and phrases are used herein and are intended to have the following meaning:

"medium" or "logging medium" or "fluid medium" mean any fluid or liquid medium which is sufficiently conductive to allow the wireline electrical logging or logging while drilling of a subterranean well;

"double emulsion" is an invert emulsion fluid with a microemulsion serving as the continuous phase;

"oleaginous fluid" is a fluid which has the nature or qualities of oil and is miscible with oil at 20° C.;

"nonoleaginous fluid" is a fluid which is not miscible with oil at 20° C.;

"Polar organic solvent" is a mono- or poly-functional alcohol (i.e. mono-hydric alcohol, di-hydric alcohol or poly-hydric alcohol, polyglycol, glycol and poly glycol ethers, etc.) which is at least partially soluble in oleaginous fluid.

"water soluble glycol" is a glycol or glycol ether which is miscible with fresh water at 20° C.;

"preferentially-oil-soluble glycol" is a glycol or glycol ether which at 20° C. is: 1) miscible at all proportions with oil, specifically with ISOPAR-M, but 2) has limited miscibility with water, specifically less than 10% by volume of the glycol ether is miscible in fresh water, that is to say the addition of greater than 10% by volume of the glycol ether mixed with fresh water results in two phases. ISOPAR-M is an isoparaffinic hydrocarbon mineral oil supplied by Exxon Chemical "electrolytic salt" is a organic or inorganic salt or brine of such salts that is at least partially soluble or miscible in the logging medium of the present invention and imparts conductivity properties to said medium such that electrical logging can take place;

"conductive medium" is any fluid medium that permits the taking of electrical well logging measurements, and in particular allows the taking of resistivity and self or spontaneous potential measurements of the well;

"carbon dioxide buffer" is a compound which removes carbon dioxide from the drilling fluid and allows longer maintenance of conductivity;

"microemulsifier" are compounds having a Griffin Hydrophilic-Lipophilic Balance (HLB) of about 10 to about 18 and is capable of forming a microemulsion of water in oil;

"HLB" and "Griffin Hydrophilic-Lipophilic Balance (HLB)" are used interchangably and is a scale used to define the hydrophilic/lipophilic character. See J.Soc. Cosmetic Chem, 1949, 1, 311; and J.Soc. Cosmetice Chem. 1954, 5, 249. The higher the number, the more hydrophilic the surfactant. The HLB number of a surfactant or of a surfactant blend can be used to evaluate its potential to fulfill a given role. HLB is commonly used in the cosmetic and pharmaceutical industries.

The present invention is directed to a method of logging a subterranean well and to a well logging medium useful in said method. In one illustrative embodiment, the method includes placing into the subterranean well a logging medium. The logging medium, which is a double emulsion, includes an oleaginous fluid, an emulsifier capable of forming a microemulsion, an emulsifier capable of forming an invert emulsion, and an electrolytic salt, the salt being present in a concentration so as to permit the electrical logging of the well. The medium may additionally contain a polar organic solvent and a carbon dioxide buffer. A second illustrative embodiment of the method of the present invention includes the drilling of a subterranean well with an oleaginous-based logging medium of the present invention. In such an embodiment the oleaginous-based logging medium of the present invention serves as the drilling fluid and enables one to take electrical log measurements of the subterranean well. In yet a third illustrative embodiment, the method includes placing into a subterranean well a fluid medium of the present invention and drilling the subterranean well with a drilling fluid in which the medium of the present invention is at least a component. The medium of the present invention should be present in the continuous phase of the drilling fluid in a concentration such that electrical logging of the well is possible. The use of drilling fluids and or muds in the drilling of a subterranean well should be within the knowledge of one of skill in the art as indicated in commonly available books such as *Petroleum Development Geology*, 3rd Ed. by Parke A. Dickey; *Nontechnical Guide to Petroleum Geology, Exploration, Drilling and Production*, by Norman J. Hyne; both available from PennWell Books and *Composition and Properties of Drilling and Completion Fluids*, 5th Ed. by H. C. H. Darley and George R. Gray available from Gulf Publishing Company, all of the contents of which are hereby incorporated herein by reference.

The logging medium, also referred to herein as simply "medium", useful in the above methods includes a miscible combination of an oleaginous fluid; an emulsifier capable of forming a microemulsion, an emulsifier capable of forming an invert emulsion, and an electrolytic salt or brine. The medium may additionally include a polar organic solvent and a carbon dioxide buffer. Such a medium should be sufficiently conductive so as to allow one skilled in the art to take electrical log measurements of the subterranean well. The medium may further comprise a gelling agent and weight material and optionally included corrosion inhibitor as are discussed below. The non-continuous phase of the present invention includes, non-oleaginous fluids such as aqueous fluids including fresh water, sea water, brine, and other similar fluids. Another illustrative medium of the present invention may also include components such as surfactants, emulsifiers, wetting agents, fluid loss control agents or combinations of these in addition to the previously set forth components.

Suitable oleaginous fluids for use in the medium of present invention include diesel, mineral oil, vegetable oil, synthetic oil, silicone oil, or mixtures of these or similar materials. Examples of vegetable oil include corn oil, soy bean oil, sunflower oil, safflower oil, rapeseed oil, peanut oil, cottonseed oil, rice bran oil, castor bean oil, linseed oil and the like. A synthetic oil may be selected from the group including esters, preferably fatty acid esters, ethers, dialkyl carbonates, acetals or synthetic hydrocarbons which are suitable for such purposes. Examples of such compounds include, olefin derivatives including internal polyolefins, and polyalphaolefins and mixtures of these, linear parafins, monocarboxylic acid esters of $C_2$ to $C_{12}$ alkanol such as those disclosed in U.S. Pat. No. 5,232,910, the contents of which are incorporated herein by reference, dialkyl carbonates in which the alkyl groups have more than 2 carbon atoms, acetals in which the alkoxy groups have more than 2 carbon atoms and the like. Examples of silicone oil that may be used in the formulation of the present invention include dimethylsiloxane polymers, also called dimethyl silicone fluids, such as those described in U.S. Pat. No. 5,707,939 the contents of which are hereby incorporated herein by reference. One of skill in the art should understand and be capable of adjusting the content of the oleaginous fluid content by systematic variation in components so as to achieve the results of the present invention.

The polar organic solvent component of the logging medium of the present invention may be a mono-hydric, di-hydric or poly-hydric alcohol or a mono-hydric, di-hydric or poly-hydric alcohol having poly-functional groups. Examples of such compounds include aliphatic mono-alcohols, (i.e. methanol, ethanol, propanol, etc.), aliphatic diols (i.e. glycols, 1,3-diols, 1,4-diols, etc.), aliphatic poly-ols (i.e. tri-ols, tetra-ols, etc.) polyglycols (i.e. polyethylenepropylene glycols, polypropylene glycol, polyethylene glycol, etc.), glycol ethers (i.e. diethylene glycol ether, triethylene glycol ether, polyethylene glycol ether, etc.) and other such similar compounds that may be found useful in the practice of the present invention. Illustrative examples of polar solvents also include propylene glycol n-butyl ether (PNB); dipropylene glycol n-butyl ether (DPNB); tripropylene glycol n-butyl ether (TPNB); tetrapropylene glycol n-butyl ether (TtPNB); pentapropylene glycol n-butyl ether (PnPNB); hexapropylene glycol n-butyl ether (HxPNB); heptapropylene glycol n-butyl ether (HpPNB), and the analogous tert-butyl ethers. In another embodiment dipropylene glycol n-butyl ether or tripropylene glycol n-butyl ether have been preferably used. The present invention may be carried out using a mixture of these above noted glycols. For example, such a mixture may include tripropylene glycol n-butyl ether, tetrapropylene glycol n-butyl ether, pentapropylene glycol n-butyl ether and hexapropylene glycol n-butyl ether herein referred to as polypropylene glycol n-butyl ether (PPNB). An example of such a mixture is commercially available from Shrieve Chemical Co. under the name Drill-Col 545-X which is also referred to herein as PPNB. The use of such fluids in the formulation of drilling fluids and drilling muds is described in greater detail in U.S. Pat. No. 5,990,050 issued Nov. 23, 1999, the contents of which are hereby incorporated herein by reference. Such compounds should be selected so as to be miscible in fresh water at 20° C. and at least partially miscible in the oleaginous fluid component described above. In addition, the polar organic solvent should be capable of at least partially solubilizing the electrolytic salt or brine in the continuous phase of the well logging medium. In another illustrative embodiment, the polar organic solvent may be selected from glycols and glycol ethers of ethylene glycol, diethylene glycol, triethylene glycol, propylene glycol, polypropylene glycol, butylene glycol and mixtures of these. The polar organic solvent may constitute up to about 95% by volume of the well logging medium and preferably is present in an amount from about 1% to about 90% by volume. One of skill in the art should understand and be capable of adjusting the content of the polar organic solvent content so as to achieve the results of the present invention.

The electrolytic salt component of the well logging medium of the present invention is an organic or inorganic salt or brine solution selected so that there is at least partial mutual solubility between the oleaginous liquid, the polar organic solvent and the salt or brine. That is to say, the electrolytic salt should be selected so as to permit the taking of electrical logs of subterranean wells in which the fluid medium of the present invention has been placed. As previously mentioned, the purpose of the electrolytic salt is to impart conductivity to the well logging medium. It should be well known to one of skill in the art that the solubilization of salts in a fluid can impart electrical conductivity to the fluid. However, prior to the present invention, the solubilization of electrolytic salts has not been possible in oleaginous based drilling fluids due to the lack of solubility of salts in the continuous phase of such fluids.

In one embodiment of the present invention the electrolytic salt is selected from the alkali and alkaline earth halides and preferably is selected from salts such as sodium chloride, sodium bromide, calcium chloride, calcium bromide, potassium chloride, ammonium chloride, magnesium chloride, organic salts or mixtures and combinations of these. Organic salts may include salts such as sodium acetate, potassium acetate, sodium citrate, quaternary amine salts or combinations thereof may be used. A quaternary amine salt is preferably utilized in place of or in addition with the aforementioned electrolytic salts. Preferably such quaternary amine salts have the formula:

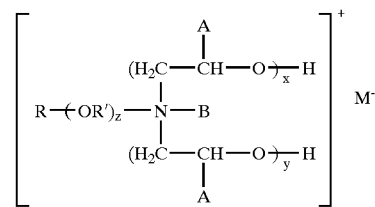

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M$^-$ is a counter anion; or combinations thereof. In one preferred embodiment, the electrolytic salt is a quaternary amine, having the formula:

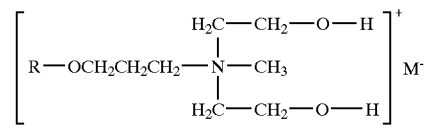

wherein M is any suitable anion, preferably halogen, and R being an alkyl have from 10 to 14 carbon atoms. In another illustrative embodiment of the present invention, the quaternary amine salt is isotridecyloxypropyldihydroxyethylmethylammonium chloride, sold under the tradename Q-17-2PG by Tomah Product Inc. of Milton Wis. USA.

The counter anion (M$^-$) may be any compatible conjugate base of an acid. Preferably, the conjugate base of a mineral acid or strong organic acid is used. Examples of such mineral acids or strong organic acids include: hydrochloric, hydrobromic and other hydrohalide acids; nitric and nitrous acid; sulfuric and sulfurous acid; perchloric acid; acetic acid; halogenated acetic acids such as chloroacetic acid, dicholoroacetic acid, trichloroacetic acid, fluoro acetic acid, difluoroacetic acid, trifluroacetic acid, and the like; organo sulfonates such a methane sulfonic acid, ethane sulfonic acid, benzosulfonic acid, and their halogenated analogs such as chloromethane sulfonic acid, trichloromethane sulfonic acid, trifluoromethane sulfonic acid, perfluorobenzosulfonic acid and the like. The primary factor in selecting a suitable counter-anion is the chemical reactivity, availability and cost, in which case simple and inexpensive counter-anions are often preferred such as chloride, nitrate, and sulfonate.

Thus the counter-anion to the quaternary amine cation may be the conjugate base of any mineral acid or strong organic acid, preferably the counter-anion is a halide ion, nitrate ion, sulfate ion, acetate ion, alkyl sulfonate ion, haloalkylsulfonate ion, or the like. Because of the ionic nature of the quaternary amine salts noted above, they function as electrolytes. One of skill in the art should understand and appreciate that the quaternary amines also exhibit an HLB value that makes them suitable for forming and stabilizing microemulsions. Thus the quaternary amines function both as electrolytes and microemulsifiers.

The well logging medium of the present invention should have an electrolytic salt concentration that is sufficient to enable the electrical logging of a subterranean well in which the medium is present. That is to say, the electrolytic salt should be present in the oleaginous continuous phase of the logging medium or drilling fluid in an amount to permit electrical logging (i.e. wireline logging) or electrical logging while drilling of the well. One of ordinary skill in the art should understand and be able to adjust the conductivity of the well logging medium of the present invention by selecting or by increasing or decreasing the concentration of the electrolytic salt so as to achieve the results of the present invention.

Emulsifiers of the present invention capable of producing a microemulsion include quaternary amine compounds such as those described herein, as well as dioctyl sulfosuccinate sold under the trade name MONAWET—MO70, and MONAMULSE 653C, both by Uniqema of New Castle, Del., USA. The emulsifier should have a Griffin Hydrophilic-Lipophilic Balance (HLB) greater than 9 and preferably of about 10 to about 18. Typically, the amount of emulsifer added to the drilling fluids or muds to form the microemulsion is 1.0 pounds per barrel to 14 pounds per barrel, preferably about 4 pounds per barrel to about 8 pounds per barrel. One of skill in the art should be able to adjust the amount of emulsifier needed to form a microemulsion.

The emulsifiers of the present invention capable of forming invert emulsions include amidoamines, calcium soaps of fatty acids, and other well known invert emulsion forming surfactants. Commercially available emulsifiers of the present invention capable of forming an invert emulsion include VERSAWET™ (a proprietary mixture of fatty acids), VERSACOAT™ and NOVAMUL™ (proprietary mixtures of amidoamine surfactants) manufactured and distributed by M-I, L.L.C in Houston, Tex. Silwet L-77, L-7001, L7605 and L-7622 are additional examples of commercially available surfactants and wetting agents manufactured and distributed by Union Carbide Chemical Company Inc. The emulsifiers capable of forming an invert emulsion should have a Griffin HLB of about 4 to about 8. Typically, the amount of emulsifier added to the drilling fluids or muds to form the invert emulsion is 1.0 pounds per barrel to 14 pounds per barrel, preferably about 4 pounds per barrel to about 8 pounds per barrel. One of skill in the art should be able to adjust the amount of emulsifier to obtain a stable invert emulsion.

As previously noted, a quaternary amine salt may act as an emulsifier capable of producing a microemulsion if it has and HLB of about 10 to about 18. Because the quaternary amine salt is also ionic, it may provide sufficient conductivity to the fluid such that an additional salt is not necessary. A non-ionic amine may be used if its HLB is about 10 to about 18, but an additional electrolytic salt may be necessary to provide conductivity.

The carbon dioxide buffer of the well logging medium of the present invention is an amine of the formula:

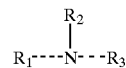

wherein, $R_1$, $R_2$, and $R_3$ are hydrogen, alkyl groups with two to five carbon atoms, hydroxyalkyl groups with two to five carbon atoms, or combinations thereof.

In one embodiment of the present invention, the amine is selected from triethanolamine, diethanolamine, monoethanolamine, and triethylamine. The well logging medium of the present invention may have a carbon dioxide buffer concentration that is sufficient to maintain the electrical conductivity necessary for the electrical logging of a subterranean well in which the medium is present. Typically, the amount of carbon dioxide buffer added is to the drilling fluids or muds is 0.1 pounds per barrel to 20 pounds per barrel. One preferred amount of carbon dioxide buffer is 2 pounds per barrel to 10 pounds per barrel of triethanolamine. One of ordinary skill in the art should understand and be able to adjust the carbon dioxide buffer amount to maintain conductivity of the well logging medium of the present invention by selecting or increasing or decreasing the concentration of the carbon dioxide buffer so as to achieve the results of the present invention.

As previously noted above, the logging medium of the present invention may further contain additives depending upon its desired end use so long as the additives do not interfere with the properties of the composition described herein. For example, emulsifiers, wetting agents, organophilic clays, viscosifiers, weighting agents, bridging agents, fluid loss control agents, and corrosion inhibitors may be added to the compositions of this invention so as to impart additional functional properties. The addition of such agents should be well known to one of skill in the art of formulating drilling fluids, drilling muds and other fluids and media used in subterranean wells.

Wetting agents and emulsifiers that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these. VERSAWET™ and VERSACOAT™ and NOVAMUL™ are examples of commercially available emulsifiers manufactured and distributed by M-I, L.L.C. that may be used in this invention. Silwet L-77, L-7001, L7605 and L-7622 are examples of commercially available surfactants and wetting agents manufactured and distributed by Union Carbide Chemical Company Inc.

Organophilic clays, normally amine treated clays, may be useful as viscosifiers in the fluid compositions of the present invention. Other viscosifiers and gellants, such as oil soluble polymers, polyamide resins, polycarboxylic acids and soaps can also be used. Attapulgite clay and sepiolite clay may also be used as viscosifiers. The amount of viscosifier used in the composition can vary depending upon the end use of the composition. However, normally about 0.1% to 6% by weight range are sufficient for most applications. VG-69™ and VG-PLUS™ are organoclay materials distributed by M-I, L.L.C., and VERSA-HRP™ is a polyamide resin material manufactured and distributed by M-I, L.L.C., that may be used in this invention.

Weighting agents or density materials suitable for use in this invention include hematite, magnetite, iron oxides, illmenite, barite, siderite, celestite, dolomite, calcite, manganese oxides, halites and the like. The quantity of such material added, if any, depends upon the desired density of the final composition. Typically, weight material is added to result in a density of up to about 22 pounds per gallon. The weight material is preferably added to achieve a density of up to 20 pounds per gallon and most preferably up to 19.5 pounds per gallon.

Fluid loss control agents typically act by coating the walls of the well. Suitable fluid loss control agents which may find utility in this invention include modified lignites, asphaltic compounds, gilsonite, organophilic humates or tannins prepared by reacting humic acid or tannic acid with amides or polyalkylene polyamines, and latex polymers. Typically, fluid loss control agents are added in amounts less than about 10% and preferably less than about 5% by weight of the fluid.

Corrosion inhibitors may also be added to the drilling fluid compositions of this invention to control the corrosion of the drilling equipment used during the drilling operation. Depending upon the type of corrosion encountered, the corrosion inhibitor may be organic or inorganic or some combination thereof. Illustrative examples of such corrosion inhibitors include phosphates, silicates, borates, zinc compounds, organic amines, benzoic acid, and benzoic acid derivatives, phosphate esters, heterocyclic nitrogen and sulfur compounds, organic acids and the like. Examples of commercially available corrosion inhibitors include sodium benzoate and benzotriazole.

In view of the above, one of skill in the art should appreciate the usefulness of the above described compositions. Further one of skill in the art should recognize that the compositions of the present invention may be used as a drilling fluid or drilling mud or as a component of a drilling fluid or drilling mud. The use of drilling fluids and drilling muds should be within the skill of one in the well drilling arts and the usefulness of the present invention should be apparent to such a person.

The following examples are included to demonstrate preferred embodiments of the invention. It should be appreciated by those of skill in the art that the techniques and compositions disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

General Information Relevant to the Examples

These tests were conducted in accordance with the appropriate published API procedures and in particular in API Bulletin RP 13B-2, 1990, the contents of which are hereby incorporated herein by reference. The following abbreviations are used in describing the following examples:

"TOMAH Q-18-2" (otcadecyldihydroxyethylmethylammonium chloride) available from Tomah Products, Inc. of Milton Wis. USA "DPNB" is dipropylene glycol n-butyl ether.

"DEG" is diethylene glycol.

"TPNB" is tripropylene glycol n-butyl ether.

"MONAWET—MO70" (dioctyl dulfosuccinate) available from Uniqema of New Castle, Del., USA.

"MONAMULSE—653C" (blend of surfactants) available from Uniqema of New Castle, Del., USA.

"LVT-200" (mineral oil) available from Conoco, Houston, Tex. USA.

"HA" means a heat aged fluid.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"GELS" is a measure of the suspending characteristics, or the thixotropic properties of a drilling fluid, measured in pounds per 100 square feet (lb/100 ft$^2$).

Conductivity for each sample was measured in microsiemens per centimeter ($\mu$S/cm) using a traceable conductivity meter from Fischer Scientific Co.

Example 1

The following invert emulsion drilling fluid was exposed to air, nitrogen, and carbon dioxide gas both with and without triethanolamine to show how the conductivity changes with increasing temperature:

| Materials (grams unless otherwise indicated) Formulation for One Barrel | Formulation CC | Formulation DD |
|---|---|---|
| IO16-18 | 196.00 | 196 |
| Versa Mul | 11.0 | 11.0 |
| Versa Coat | 4.0 | 4.0 |
| Triethanolamine | 0 | 3.5 |
| Bentone 38 | 5.0 | 5.0 |
| Lime | 2.0 | 1.0 |
| CaCl$_2$ (25%) | 66.0 | 66.0 |
| Shrieve 545X | 18.0 | 18.0 |
| TOMAH Q-17-2PG | 12.0 | 12.0 |

TOMAH Q-17-2PG is 75% Quaternary Amine Salt in Propylene Glycol available commercially from Tomah Products, Inc. of Milton Wis. USA and Shrieve 545X is a polypropylene glycol butyl ether blend commercially available. IO16-18 is an isomerized internal olefin synthetic hydrocarbon having 16-18 carbon atoms.

| Gas Bubbled through Fluid CC: | Air | Nitrogen | Carbon dioxide |
|---|---|---|---|
| Conductivity @ 90° F. ($\mu$S/cm) | 800 | 800 | 800 |
| Conductivity @ 95° F. ($\mu$S/cm) | 730 | 800 | 550 |
| Conductivity @ 100° F. ($\mu$S/cm) | 500 | 770 | 380 |
| Conductivity @ 105° F. ($\mu$S/cm) | 410 | 740 | 220 |
| Conductivity @ 110° F. ($\mu$S/cm) | 360 | 720 | 90 |
| Conductivity @ 115° F. ($\mu$S/cm) | 310 | 710 | 35 |
| Conductivity @ 120° F. ($\mu$S/cm) | 305 | 700 | 15 |
| Conductivity @ 125° F. ($\mu$S/cm) | 300 | 700 | 2 |
| Rate of temperature increase (° F./min) | 1.38 | 1.35 | 1.34 |

| Fluid exposed to carbon dioxide: | DD |
|---|---|
| Conductivity @ 90° F. ($\mu$S/cm) | 800 |
| Conductivity @ 95° F. ($\mu$S/cm) | 800 |
| Conductivity @ 100° F. ($\mu$S/cm) | 790 |
| Conductivity @ 105° F. ($\mu$S/cm) | 760 |
| Conductivity @ 110° F. ($\mu$S/cm) | 750 |
| Conductivity @ 115° F. ($\mu$S/cm) | 740 |
| Conductivity @ 120° F. ($\mu$S/cm) | 740 |
| Conductivity @ 125° F. ($\mu$S/cm) | 740 |
| Rate of temperature increase (° F./min) | 1.36 |

In the invert emulsion above, there is a microemulsion serving as the continuous phase. The quaternary amine salt serves as the microemulsifier. The above shows that the fluid with triethanolamine maintained conductivity when exposed to carbon dioxide. Further one of ordinary skill in the art should appreciate that the conductivity of a fluid not containing TEA declines in the presence of carbon dioxide or air that contains carbon dioxide. This is in contrast with the results shown for exposure of the same fluid to pure nitrogen or the inclusion of the TEA. Based on the above, one of ordinary skill in the art should conclude that carbon dioxide cause the reduction in conductivity and that TEA serves to buffer the harm cause by carbon dioxide on the fluids conductivity.

Example 2

The following drilling fluids formulated with different amines show how the conductivity changes with increasing temperature when carbon dioxide gas is bubbled through the fluid:

| Materials (pounds unless otherwise indicated) Formulation for One Barrel | Formulation EE |
|---|---|
| IO16-18 | 196 |
| Versa Mul | 11.0 |
| Versa Coat | 4.0 |
| Amine (as indicated below) | 3.5 |
| Bentone 38 | 5.0 |
| CaCl$_2$ (25%) | 66 |
| Shrieve 545X | 18 |
| TOMAH Q-17-2PG | 12 |

| Amine in Fluid EE: | TEA | DEA | MEA |
|---|---|---|---|
| Conductivity @ 90° F. ($\mu$S/cm) | 800 | 800 | 800 |
| Conductivity @ 95° F. ($\mu$S/cm) | 790 | 790 | 780 |
| Conductivity @ 100° F. ($\mu$S/cm) | 740 | 760 | 770 |
| Conductivity @ 105° F. ($\mu$S/cm) | 700 | 720 | 760 |
| Conductivity @ 110° F. ($\mu$S/cm) | 690 | 705 | 710 |
| Conductivity @ 115° F. ($\mu$S/cm) | 680 | 700 | 680 |
| Conductivity @ 120° F. ($\mu$S/cm) | 660 | 700 | 680 |
| Conductivity @ 125° F. ($\mu$S/cm) | 650 | 700 | 680 |
| Rate of temperature increase (° F./min) | 1.35 | 1.35 | 1.37 |

TEA = triethanolamine
DEA = diethanolamine
MEA = monoethanolamine

One of ordinary skill in the art should appreciate upon review of the above that upon being exposed to a temperature increase the fluids of the present invention maintain their conductivity.

Example 3

The following microemulsions were formed and the conductivity measured:

| Materials (grams) | Formulation A | Formulation B |
|---|---|---|
| LVT-200 | 35.0 | 35.0 |
| MONAWET—M070 | 5.0 | 0 |
| MONAMULSE—653C | 0 | 8.0 |
| Water | 2.5 | 2.5 |
| Conductivity ($\mu$S/cm) | 558 | 455 |

One of skill in the art should recognize that the two fluids above may be used as the continuous phase of an invert emulsion used in electrical logging operations.

In view of the above, one of ordinary skill in the art should understand and appreciate that one illustrative embodiment of the present invention includes a method for the electrical logging a subterranean well. Such an illustrative method may include the steps: placing into the subterranean well a logging medium, the logging medium including in the medium's continuous phase an oleaginous fluid, and an electrolytic salt, the electrolytic salt being present in a concentration so as to permit the electrical logging of the subterranean well, and electrically logging the subterranean well. The medium also contains an emulsifier capable of forming a microemulsion and an emulsifier capable of forming an invert emulsion. The medium may additionally contain a polar organic solvent and a carbon dioxide buffer. Preferably the method is carried out such that the oleaginous fluid utilized may further include a component selected from diesel, mineral oil, synthetic oil, vegetable oil, silicone oil, or combinations thereof in addition to the preferentially-oil-soluble glycol.

It is preferred that the polar organic solvent used in the above illustrative method be selected from propylene glycol n-butyl ether (PNB); dipropylene glycol n-butyl ether (DPNB); tripropylene glycol n-butyl ether (TPNB); tetrapropylene glycol n-butyl ether (TtPNB); pentapropylene glycol n-butyl ether (PnPNB); hexapropylene glycol n-butyl ether (HxPNB); heptapropylene glycol n-butyl ether (HpPNB), and the analogous tert-butyl ethers. Likewise, it is preferred that the electrolytic salt utilized in the illustrative method be selected from: sodium chloride; sodium bromide; potassium chloride; ammonium chloride; magnesium chloride; calcium chloride; calcium bromide; sodium acetate; potassium acetate; sodium citrate; a quaternary amine having the formula:

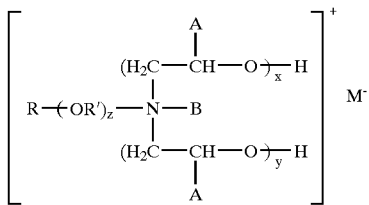

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M$^-$ is a counter anion; or combinations thereof. Another preferred embodiment of the present illustrative method utilizes an electrolytic salt that is a quaternary amine having the formula:

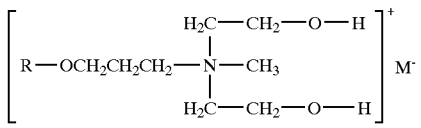

wherein M is any suitable anion, preferably halogen, and R being an alkyl have from 10 to 14 carbon atoms. In another illustrative embodiment of the present invention, the quaternary amine salt is isotridecyloxypropyldihydroxyethylmethylammonium chloride.

It is preferred that the carbon dioxide buffer used in the above illustrative method be selected from an amine of the formula:

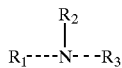

wherein, $R_1$, $R_2$, and $R_3$ are hydrogen, alkyl groups with two to five carbon atoms, hydroxyalkyl groups with two to five carbon atoms, or combinations thereof. In another illustrative embodiment of the present invention, the amine is triethanolamine, diethanolamine, monoethanolamine, or triethylamine.

The logging medium utilized in the methods of the present invention may further include components found in drilling fluids. Thus in one such embodiment a gelling agent is included in the formulation of the logging medium and the gelling agent is preferably selected from clays, organophilic clays, polymers, polyamides, polymer emulsions or combinations thereof. Another such illustrative embodiment includes a weight material in the logging medium and preferably the weighting material is selected from hematite, magnetite, iron oxides, illmenite, barite, siderite, celestite, dolomite, calcite, manganese oxides, halites or combinations thereof. In yet a third illustrative embodiment, the logging medium further includes a corrosion inhibitor selected from phosphates, silicates, borates, zinc compounds, organic amines, benzoic acid, and benzoic acid derivatives, phosphate esters, heterocyclic nitrogen and sulfur compounds, organic acids or combinations thereof. And in another illustrative embodiment of the inventive method, the logging medium further includes surfactant, emulsifier, wetting agent, fluid loss control agent or combinations thereof.

The method of the present invention may also include drilling the well with a drilling fluid in which the logging medium of the present invention is a component of the drilling fluid in sufficient concentration so as to enable one to make electrical log measurements of the subterranean well.

Also encompassed within the scope of the present invention is a logging medium for use in taking the electrical log of a subterranean well. Such an illustrative logging medium may include in its continuous phase: an oleaginous fluid, and an electrolytic salt, the salt being in a concentration so as to permit the electrical logging of a subterranean well. The medium additionally contains an emulsifier capable of forming a microemulsion and an emulsifier capable of forming an invert emulsion. Further, the medium may contain a polar organic solvent and a carbon dioxide buffer. The illustrative logging medium should be formulated such that the oleaginous fluid is selected from diesel, mineral oil, synthetic oil, vegetable oil, silicone oil, or combinations thereof in addition to the preferentially-oil-soluble glycol. The polar organic solvent (also referred to as the co-solvent) is selected from propylene glycol n-butyl ether (PNB); dipropylene glycol n-butyl ether (DPNB); tripropylene glycol n-butyl ether (TPNB); tetrapropylene glycol n-butyl ether (TtPNB); pentapropylene glycol n-butyl ether (PnPNB); hexapropylene glycol n-butyl ether (HxPNB); heptapropylene glycol n-butyl ether (HpPNB), and the analogous tert-butyl ethers. The electrolytic salt is preferably selected from salts that form a conductive logging medium and more preferably from the group including: sodium chloride, sodium bromide, potassium chloride, ammonium chloride, magnesium chloride, calcium chloride, calcium bromide, sodium acetate, potassium acetate, sodium citrate, a quaternary amine having the formula:

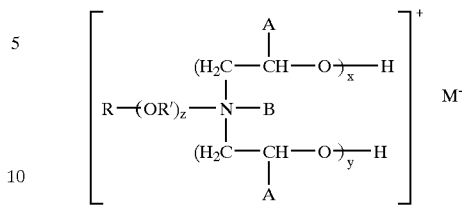

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and $M^-$ is a counter anion; or combinations thereof. In another preferred embodiment, the electrolytic salt is a quaternary amine having the formula:

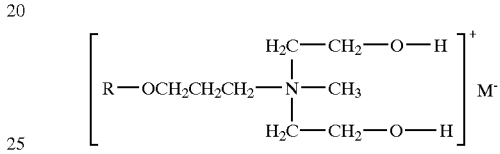

wherein M is any suitable anion, preferably halogen, and R being an alkyl have from 10 to 14 carbon atoms. In another illustrative embodiment of the present invention, the quaternary amine salt is isotridecyloxypropyldihydroxyethylmethylammonium chloride.

It is preferred that the carbon dioxide buffer used in the above illustrative method be selected from an amine of the formula:

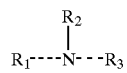

wherein, $R_1$, $R_2$, and $R_3$ are hydrogen, alkyl groups with two to five carbon atoms, hydroxyalkyl groups with two to five carbon atoms, or combinations thereof. In another illustrative embodiment of the present invention, the amine is triethanolamine, diethanolamine, monoethanolamine or triethylamine.

The illustrative logging medium may further include components common to a drilling fluid. Thus in one illustrative embodiment a gelling agent is added and preferably the gelling agent is selected from clays, organophilic clays, polymers, polyamides, polymer emulsions or combinations thereof. In another illustrative embodiment may include a weight material wherein the weight material is selected from hematite, magnetite, iron oxides, illmenite, barite, siderite, celestite, dolomite, calcite, magnesium oxides, halites or combinations thereof. Corrosion inhibitors may also be included in the formulation of the logging medium of the present invention and such corrosion inhibitors may be selected from phosphates, silicates, borates, zinc compounds, organic amines, benzoic acid, and benzoic acid derivatives, phosphate esters, heterocyclic nitrogen and sulfur compounds, organic acids or combinations thereof. The logging medium of the present illustrative embodiment may further include a surfactant, an emulsifier, a wetting agent, a fluid loss control agent and combinations thereof. The logging medium of the present invention may also be the continuous phase of an invert emulsion drilling fluid.

While the compositions and methods of this invention have been described in terms of preferred embodiments, it will be apparent to those of skill in the art that variations may be applied to the process described herein without departing from the concept, spirit and scope of the invention. All such similar substitutes and modifications apparent to those skilled in the art are deemed to be within the spirit, scope and concept of the invention as it is set out in the following claims.

What is claimed is:

1. A method for the electrical logging of a subterranean well comprising:

placing into the subterranean well a double emulsion logging medium, said double emulsion logging medium comprising an invert emulsion with a microemulsion as the continuous phase, wherein said microemulsion comprises an oleaginous fluid, and an electrolytic salt, said electrolytic salt being present in a concentration so as to permit the electrical logging of the subterranean well, said double emulsion logging fluid also comprising a first emulsifier capable of forming a microemulsion and second emulsifier capable of forming an invert emulsion, and electrically logging said subterranean well.

2. The method of claim 1 wherein said first emulsifier has a Griffin HLB greater than about 9.

3. The method of claim 2 wherein the first emulsifier is dioctyl sulfosuccinate.

4. The method of claim 1 wherein said second emulsifier has a Griffin HLB of about 4 to about 8.

5. The method of claim 1 wherein the double emulsion logging medium further comprises a polar organic solvent.

6. The method of claim 5 wherein said polar organic solvent comprises a glycol, glycol ether or mixture thereof.

7. The method of claim 5 wherein the polar organic solvent is selected from the group consisting of ethylene glycol, diethylene glycol, triethylene glycol, propylene glycol, butylene glycol, polyethylene glycol, polypropylene glycol, polyethylene-propylene glycol propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether, the analogous tert-butyl ethers and combinations thereof.

8. The method of claim 1 wherein said oleaginous fluid comprises a component selected from the group consisting of diesel, mineral oil, synthetic oil, vegetable oil, silicone oil, or combinations thereof.

9. The method of claim 1 wherein said double emulsion logging medium is a component of a drilling fluid.

10. The method of claim 1 wherein the electrolytic salt is a quaternary amine salt having the formula:

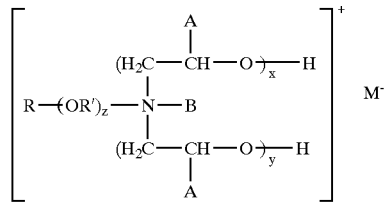

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M⁻ is a counter anion; or combinations thereof.

11. The method of claim 1 wherein the electrolytic salt is a quaternary amine salt having the formula:

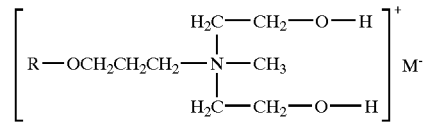

wherein M is any suitable anion, preferably halogen, and R being an alkyl have from 10 to 14 carbon atoms.

12. The method of claim 1 wherein the electrolytic salt is isotridecyloxypropyl-dihydroxyethylmethylammonium chloride.

13. The method of claim 1 wherein the double emulsion logging medium further comprises a carbon dioxide buffer.

14. The method of claim 13 wherein the carbon dioxide buffer is a functionally effective concentration of an amine of the following general formula:

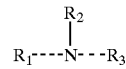

wherein, $R_1$, $R_2$, and $R_3$ are hydrogen, alkyl groups with two to five carbon atoms, hydroxyalkyl groups with two to five carbon atoms, or combinations thereof.

15. The method of claim 14 wherein the amine is selected from the group consisting of triethanolamine, diethanolamine, monoethanolamine, and triethylamine.

16. The method of claim 1 wherein the double emulsion logging medium further comprises a gelling agent selected from the group consisting of clays, organophilic clays, polymers, polyamides, polymer emulsions or combinations thereof.

17. The method of claim 1 wherein the double emulsion logging medium further comprises a weight material selected from the group consisting of hematite, magnetite, iron oxides, illmenite, barite, siderite, celestite, dolomite, calcite, manganese oxides, halites or combinations thereof.

18. The method of claim 1 wherein said double emulsion logging medium further comprises corrosion inhibitor selected from the group consisting of phosphates, silicates, borates, zinc compounds, organic amines, benzoic acid, and benzoic acid derivatives, phosphate esters, heterocyclic nitrogen and sulfur compounds, organic acids or combinations thereof.

19. The method of claim 1 wherein said double emulsion logging medium further comprises surfactant, third emulsifier, wetting agent, fluid loss control agent or combinations thereof.

20. The method of claim 1 further comprising drilling said well with a drilling fluid in which said double emulsion logging medium is a component of said drilling fluid, said double emulsion logging medium being in sufficient concentration so as to enable one to make electrical log measurements of the subterranean well.

21. A double emulsion logging medium for use in taking the electrical log of a subterranean well, said double emulsion logging medium comprising an invert emulsion with a microemulsion as the continuous phase, wherein said microemulsion comprises an oleaginous fluid, and an electrolytic salt, said electrolytic salt being present in a concentration so as to permit the electrical logging of the subterranean well, said double emulsion logging fluid also comprising a first emulsifier capable of forming a microemulsion and a second emulsifier capable of forming an invert emulsion.

22. The double emulsion logging medium of claim 21 further comprising a polar organic solvent.

23. The double emulsion logging medium of claim 22 wherein said polar organic solvent comprises a glycol, glycol ether or mixture thereof.

24. The double emulsion logging medium of claim 22 wherein the polar organic solvent is selected from the group consisting of ethylene glycol, diethylene glycol, triethylene glycol, propylene glycol, butylene glycol, polyethylene glycol, polypropylene glycol, polyethylene-propylene glycol propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether, the analogous tert-butyl ethers and combinations thereof.

25. The double emulsion logging medium of claim 21 wherein said oleaginous fluid is selected from the group consisting of diesel, mineral oil, synthetic oil, vegetable oil, silicone oil, or combinations thereof.

26. The double emulsion logging medium of claim 21 wherein said double emulsion logging medium is a component of a drilling fluid.

27. The double emulsion logging medium of claim 21 wherein the electrolytic salt is a quaternary amine salt having the formula:

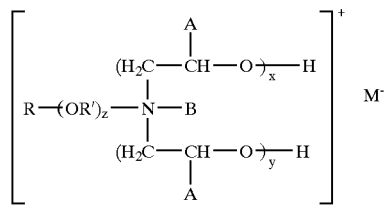

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, $x+y=1$ to 15, z is 0 to 3, and $M^-$ is a counter anion; or combinations thereof.

28. The double emulsion logging medium of claim 21 wherein the electrolytic salt is a quaternary amine salt having the formula:

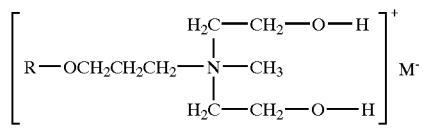

wherein M is any suitable anion, preferably halogen, and R being an alkyl have from 10 to 14 carbon atoms.

29. The double emulsion logging medium of claim 21 wherein the electrolytic salt is isotridecyloxypropyldihydroxyethylmethylammonium chloride.

30. The double emulsion logging medium of claim 21 further comprising a carbon dioxide buffer.

31. The double emulsion logging medium of claim 29 wherein the carbon dioxide buffer is a functionally effective concentration of an amine of the following general formula:

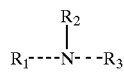

wherein, $R_1$, $R_2$, and $R_3$ are hydrogen, alkyl groups with two to five carbon atoms, hydroxyalkyl groups with two to five carbon atoms, or combinations thereof.

32. The double emulsion logging medium of claim 30 wherein the amine is selected from the group consisting of triethanolamine, diethanolamine, triethanolamine, and triethylamine.

33. The double emulsion logging medium of claim 21 wherein the double emulsion logging medium further comprises a gelling agent selected from the group consisting of clays, organophilic clays, polymers, polyamides, polymer emulsions or combinations thereof.

34. The double emulsion logging medium of claim 21 wherein the logging medium further comprises a weight material selected from the group consisting of hematite, magnetite, iron oxides, illmenite, barite, siderite, celestite, dolomite, calcite, manganese oxides, halites or combinations thereof.

35. The double emulsion logging medium of claim 21 wherein said double emulsion logging medium further comprises corrosion inhibitor selected from the group consisting of phosphates, silicates, borates, zinc compounds, organic amines, benzoic acid, and benzoic acid derivatives, phosphate esters, heterocyclic nitrogen and sulfur compounds, organic acids or combinations thereof.

36. The double emulsion logging medium of claim 21 further comprising surfactant, third emulsifier, wetting agent, fluid loss control agent and combinations thereof.

37. A method for drilling a subterranean well comprising:

placing into the subterranean well a double emulsion logging medium, said double emulsion logging medium comprising an invert emulsion with a microemulsion as the continuous phase, wherein said microemulsion comprises an oleaginous fluid, and an electrolytic salt, said electrolytic salt being present in a concentration so as to permit the electrical logging of the subterranean well, said double emulsion logging fluid also comprising a first emulsifier capable of forming a microemulsion and a second emulsifier capable of forming an invert emulsion, and drilling said subterranean well.

38. The method of claim 36 wherein the double emulsion logging medium further comprises a polar organic solvent and a carbon dioxide buffer.

39. A method of making a double emulsion logging medium for use in taking the electrical log of a subterranean well comprising forming a microemulsion with an oleaginous fluid, an electrolytic salt, and a first emulsifier capable of forming a microemulsion, said electrolytic salt being present in a concentration so as to permit the electrical logging of the subterranean well, and forming an invert emulsion comprising a second emulsifier capable of forming an invert emulsion and said microemulsion as the continuous phase.

40. The method of claim 38 wherein the double emulsion logging medium further comprises a polar organic solvent and a carbon dioxide buffer.

41. A method for the electrical logging a subterranean well comprising:

placing into the subterranean well a double emulsion logging medium, said double emulsion logging medium comprising an invert emulsion with a microemulsion as the continuous phase, wherein said double emulsion logging medium comprises an oleaginous fluid, a polar organic solvent, an electrolytic salt, a first emulsifier capable of forming a microemulsion, a second emulsifier capable of forming an invert emulsion, and a carbon dioxide buffer, wherein the electrolytic salt is a quaternary amine salt having the formula:

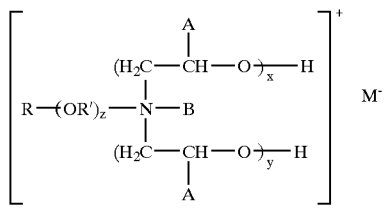

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M⁻ is a counter anion; or combinations thereof; and wherein said electrolytic salt being present in a concentration so as to permit the electrical logging of the subterranean well, and wherein the carbon dioxide buffer is a functionally effective concentration of an amine of the following general formula:

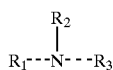

wherein, $R_1$, $R_2$, and $R_3$ are hydrogen, alkyl groups with two to five carbon atoms, hydroxyalkyl groups with two to five carbon atoms, or combinations thereof, and electrically logging said subterranean well.

42. A method for the electrical logging a subterranean well comprising:

placing into the subterranean well a double emulsion logging medium, said double emulsion logging medium comprising an invert emulsion with a microemulsion as the continuous phase, wherein said double emulsion logging medium comprises an oleaginous fluid, a polar organic solvent, an electrolytic salt, a first emulsifier capable of forming a microemulsion, a second emulsifier capable of forming an invert emulsion, and a carbon dioxide buffer, wherein the polar organic solvent is selected from the group consisting of ethylene glycol, diethylene glycol, triethylene glycol, propylene glycol, butylene glycol, polyethylene glycol, polypropylene glycol, polyethylene-propylene glycol propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether, the analogous tert-butyl ethers and combinations thereof;

wherein the electrolytic salt has the formula:

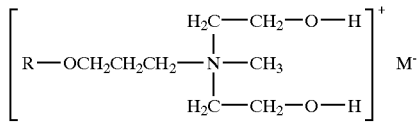

wherein M is any suitable anion, preferably halogen, and R being an alkyl have from 10 to 14 carbon atoms; or combinations thereof; and wherein said electrolytic salt being present in a concentration so as to permit the electrical logging of the subterranean well, wherein the first emulsifier is dioctyl sulfosuccinate, and wherein the carbon dioxide buffer is a functionally effective concentration of an amine selected from the group consisting of: triethanolamine, diethanolamine, monoethanolamine, and triethylamine, and electrically logging said subterranean well.

43. A method for the electrical logging a subterranean well comprising:

placing into the subterranean well a double emulsion logging medium, said double emulsion logging medium comprising an invert emulsion with a microemulsion as the continuous phase, wherein said double emulsion logging medium comprises an oleaginous fluid, a polar organic solvent, and an electrolytic salt, a first emulsifier capable of forming a microemulsion, a second emulsifier capable of forming an invert emulsion, and a carbon dioxide buffer, wherein the oleaginous fluid is selected from the group consisting of diesel, mineral oil, synthetic oil, vegetable oil, silicone oil, or combinations thereof;

wherein the polar organic solvent is selected from the group consisting of ethylene glycol, diethylene glycol, triethylene glycol, propylene glycol, butylene glycol, polyethylene glycol, polypropylene glycol, polyethylene-propylene glycol propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether, the analogous tert-butyl ethers and combinations thereof;

wherein the electrolytic salt is isotridecyloxypropyldihydroxyethylmethylammonium chloride; and wherein the carbon dioxide buffer is triethanolamine;

wherein the first emulsifier is dioctyl sulfosuccinate, and wherein said electrolytic salt being present in a concentration so as to permit the electrical logging of the subterranean well, and electrically logging said subterranean well.

44. A composition comprising:

an invert emulsion with a microemulsion as the continuous phase, wherein said microemulsion comprises an oleaginous fluid, and an electrolytic salt, a polar organic solvent, and a carbon dioxide buffer, said composition also comprising a first emulsifier capable of forming a microemulsion and a second emulsifier capable of forming an invert emulsion, and wherein the polar organic solvent comprises a glycol, glycol ether or mixture thereof;

wherein the electrolytic salt is a quaternary amine salt having the formula:

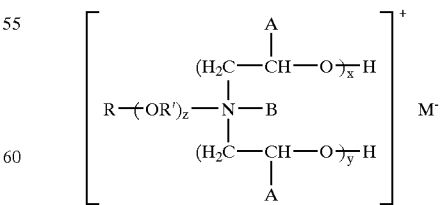

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A⁻ is hydrogen or alkyl with 1 to 4 carbon atoms, x+y=1 to 15, z is 0 to 3, and M⁻ is a counter anion; or combinations thereof; and wherein said electrolytic salt being present in a concentration so as to permit the electrical logging of the subterranean well;

wherein the first emulsifier is dioctyl sulfosuccinate, and wherein the carbon dioxide buffer is a functionally effective concentration of an amine of the following general formula:

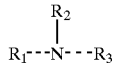

wherein, $R_1$, $R_2$, and $R_3$ are hydrogen, alkyl groups with two to five carbon atoms, hydroxyalkyl groups with two to five carbon atoms, or combinations thereof.

45. A double emulsion medium useful in the electrical logging of a subterranean well, the double emulsion medium comprising:

an invert emulsion with a microemulsion as the continuous phase, wherein said microemulsion comprises an oleaginous fluid, a polar organic solvent, a carbon dioxide buffer, and an electrolytic salt, said electrolytic salt being present in a concentration so as to permit the electrical logging of the subterranean well, said medium also comprising a first emulsifier capable of forming a microemulsion and a second emulsifier capable of forming an invert emulsion, wherein the polar organic solvent is selected from the group consisting of ethylene glycol, diethylene glycol, triethylene glycol, propylene glycol, butylene glycol, polyethylene glycol, polypropylene glycol, polyethylene-propylene glycol propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether, the analogous tert-butyl ethers and combinations thereof;

wherein the electrolytic salt has the formula:

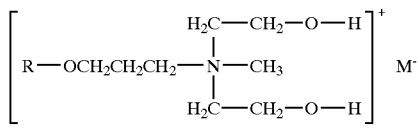

wherein M is any suitable anion, preferably halogen, and R being an alkyl having from 10 to 14 carbon atoms; or combinations thereof; and wherein said electrolytic salt being present in a concentration so as to permit the electrical logging of the subterranean well;

wherein the first emulsifier is dioctyl sulfosuccinate, and wherein the carbon dioxide buffer is in a functionally effective concentration of an amine selected from the group consisting of: triethanolamine, diethanolamine, monoethanolamine, and triethylamine and said logging medium additionally containing an emulsifier capable of forming a microemulsion, and an emulsifier capable of forming an invert emulsion.

46. A conductive double emulsion medium useful in the electrical logging a subterranean well, said conductive double emulsion medium comprising:

an invert emulsion with a microemulsion as the continuous phase, wherein said microemulsion comprises an oleaginous fluid, a polar organic solvent, a carbon dioxide buffer, and an electrolytic salt, said electrolytic salt being present in a concentration so as to permit the electrical logging of the subterranean well, said double emulsion medium also comprising a first emulsifier capable of forming a microemulsion and a second emulsifier capable of forming an invert emulsion, wherein the oleaginous fluid is selected from the group consisting of diesel, mineral oil, synthetic oil, vegetable oil, silicone oil, or combinations thereof;

wherein the polar organic solvent is selected from the group consisting of ethylene glycol, diethylene glycol, triethylene glycol, propylene glycol, butylene glycol, polyethylene glycol, polypropylene glycol, polyethylene-propylene glycol propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether, the analogous tert-butyl ethers and combinations thereof;

wherein the electrolytic salt is isotridecyloxypropyldihydroxyethylmethylammonium chloride; and wherein the carbon dioxide buffer is triethanolamine;

wherein the first emulsifier is dioctyl sulfosuccinate, and wherein said electrolytic salt being present in a concentration so as to permit the electrical logging of the subterranean well.

47. A method for the electrical logging a subterranean well while drilling comprising:

drilling oil well with a conductive double emulsion logging medium, said double emulsion logging medium an invert emulsion with a microemulsion as the continuous phase, wherein said microemulsion comprises an oleaginous fluid, a polar organic solvent, a carbon dioxide buffer, and an electrolytic salt, said electrolytic salt being present in a concentration so as to permit the electrical logging of the subterranean well, said double emulsion logging fluid also comprising a first emulsifier capable of forming a microemulsion and a second emulsifier capable of forming an invert emulsion, and electrically logging said subterranean well while drilling.

48. The method of claim 42 wherein the carbon dioxide buffer is a functionally effective concentration of an amine of the following general formula:

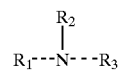

wherein, $R_1$, $R_2$, and $R_3$ are hydrogen, alkyl groups with two to five carbon atoms, hydroxyalkyl groups with two to five carbon atoms, or combinations thereof.

49. The double emulsion logging medium of claim 21 wherein the electrolytic salt has a Griffin HLB of about 10 to about 18 and additionally serves as the first emulsifier capable of forming a microemulsion.

* * * * *